United States Patent [19]
Schönfeld et al.

[11] Patent Number: 6,017,984
[45] Date of Patent: Jan. 25, 2000

[54] COLORED CHOLESTERIC LIQUID-CRYSTAL POLYMERS HAVING OPTICALLY VARIABLE PROPERTIES

[75] Inventors: Axel Schönfeld, Wiesbaden; Erwin Dietz, Königstein; Bernd Dewald, Idstein, all of Germany

[73] Assignee: Clariant GmbH, Frankfurt, Germany

[21] Appl. No.: 08/951,939

[22] Filed: Oct. 16, 1997

[30] Foreign Application Priority Data

Oct. 21, 1996 [DE] Germany .................. 196 43 277

[51] Int. Cl.[7] .................................................. C08K 3/00
[52] U.S. Cl. ................... 524/190; 524/356; 524/560; 524/588; 524/602; 524/606; 524/715; 524/770; 524/837; 524/845
[58] Field of Search .................. 524/715, 837, 524/845, 770, 190, 356, 560, 588, 602, 606

[56] References Cited

U.S. PATENT DOCUMENTS

| | | | |
|---|---|---|---|
| 3,754,735 | 8/1973 | Hoyle ........................ | 137/567 |
| 4,345,074 | 8/1982 | Hufnagel ................... | 544/91 |
| 4,412,059 | 10/1983 | Krigbaum et al. ......... | 528/192 |
| 4,610,804 | 9/1986 | Imazeki et al. ............ | 260/369 |
| 4,652,626 | 3/1987 | Orii et al. .................. | 528/194 |
| 5,093,025 | 3/1992 | Koide et al. ............... | 528/176 |
| 5,358,661 | 10/1994 | Mazaki et al. ............. | 528/299 |
| 5,362,315 | 11/1994 | Mueller-Rees et al. .... | 106/493 |
| 5,495,037 | 2/1996 | Hsu et al. ................... | 528/26 |

FOREIGN PATENT DOCUMENTS

| | | |
|---|---|---|
| 0 196 785 A1 | 8/1986 | European Pat. Off. . |
| 0 283 273 A2 | 9/1988 | European Pat. Off. . |
| 0 391 368 A1 | 10/1990 | European Pat. Off. . |
| 0 608 991 A1 | 8/1994 | European Pat. Off. . |
| 4240743 A1 | 6/1994 | Germany . |
| 4418490 A1 | 11/1995 | Germany . |
| WO 95/29961 | 11/1995 | WIPO . |

OTHER PUBLICATIONS

Eberle H.–J. et al: "Inverse angle dependence of the reflection colours of cholesteric polymeric liquid crystals mixed with pigments," Liquid Crystals, vol. 5, No. 3, 1. Jan. 1989, Seiten 907–916, XP000124433 in der Anmeldung erwähnt siehe Seite 907.

*Primary Examiner*—Rachel Gorr
*Attorney, Agent, or Firm*—Susan S. Jackson

[57] ABSTRACT

The invention relates to colorant compositions consisting essentially of one or more cholesteric liquid-crystalline polymers and at least one colorant which absorbs light in the visible wavelength range. Suitable colorants are organic or inorganic pigments or dyes. Coatings comprising such colorant compositions feature color effects which are dependent on the viewing angle and which cannot be obtained by means of absorption pigments alone or by means of cLCP effect coatings.

10 Claims, No Drawings

COLORED CHOLESTERIC LIQUID-CRYSTAL POLYMERS HAVING OPTICALLY VARIABLE PROPERTIES

The invention relates to cholesteric liquid-crystal polymers (cLCPs) which have been colored, to a process for their preparation, and to their use.

Cholesteric main-chain polymers are known and can be prepared in analogy to nematic main-chain polymers by using an additional chiral comonomer (U.S. Pat. No. 4,412,059; U.S. Pat. No. 652,626; U.S. Pat. No. 5,358,661; U.S. Pat. No. 5 093 025) or by reacting nematic main-chain polymers (LCPs) with additional chiral comonomers (EP-A-0 283 273). A feature of cholesteric main-chain polymers is their helical superstructure. One of the consequences of this is that the material no longer exhibits the anisotropy of mechanical properties which is conventional with nematic liquid-crystal polymers. Depending on the content of chiral monomer, the material shows pronounced color effects which are based on the selective reflection at the helical superstructure. The exact reflection color depends in this case on the viewing angle and above all on the pitch of the helix. For any given viewing angle—for example, perpendicular viewing of a sample—the reflection color which appears is a color having a wavelength which corresponds to the pitch of the helical superstructure. This means that the wavelength of the reflected light is shorter the smaller the pitch of the helix. The helical pitch which develops depends essentially on the proportion of the chiral comonomer, on the nature of incorporation into the polymer, on the degree of polymerization and on the structure of the chiral comonomer. Furthermore, many systems also show temperature-dependence of the pitch in the cholesteric phase.

The color of the cholesteric liquid crystals is based on selective reflection. It is therefore fundamentally different in nature from the coloration of conventional pigments, whose color is based on light absorption (absorption pigments).

To obtain pronounced color effects with thin layers of cholesteric liquid crystals generally requires an absorbing substrate, in particular a black substrate, since otherwise the inadequately pronounced hiding power of the cholesteric liquid crystals causes the nonselective part of the light to be reflected at the substrate, which attenuates the perceived color. It is also known (H. J. Eberle, Liquid Crystals, 1989, Vol. 5, No. 3, pages 907–916), that instead of a black substrate it is also possible to use differently colored substrates. Coating the substrate with a color, however, brings with it disadvantages. Firstly, this is an additional process step entailing additional costs, and secondly the color effect is then dependent on the thickness of the liquid-crystal layer applied over it, since it is this which determines the proportion of absorption pigment to liquid-crystal pigment. Moreover, coating materials produced in this way do not have the required ease of repair.

The object of the present invention is to circumvent the disadvantages of the prior art and to provide a material which has colors dependent on the viewing angle, which gives level colorations without inhomogeneities in color, and which is of high temperature stability and high chemical resistance (insolubility).

It has been found that the disadvantages of the prior art can surprisingly be circumvented by means of cholesteric liquid-crystalline polymers which have been colored with a colorant and that novel materials can be provided in a simple manner.

The present invention provides a colorant composition consisting essentially of one or more cholesteric liquid-crystalline polymers and at least one colorant which absorbs light in the visible wavelength range.

By colorants which absorb light in the visible wavelength range are meant those which have at least one absorption maximum between 350 and 750 nm. The term colorants for the purposes of the present invention means both dyes and pigments.

In the unoriented state, a cholesteric liquid-crystalline polymer colored with said colorant has the color of the colorant. If such a sample is oriented in the cholesteric phase, then the bright color characteristics of selective reflection can be observed.

Surprisingly, these characteristics are different from those of the cholesteric polymers in that the hues are modulated by the absorption of the colorants. This means that a polymer which contains, for example, a red colorant has in the cholesteric phase not, say, a golden yellow color but a reddish gold color instead. In addition, the angular dependence of the cholesteric reflection colors takes on a new appearance by modulation with the absorption color. For instance, when viewed at an oblique angle, a cholesteric liquid-crystalline polymer having said reddish golden color exhibits a reddish green color.

The cholesteric polymers on which the invention is based comprise cholesteric liquid-crystalline main-chain polymers, cholesteric liquid-crystalline side-group polymers and combined liquid-crystalline main-chain/side-group polymers.

Examples of cholesteric liquid-crystalline side-group polymers are polysiloxanes, cyclic siloxanes, polyacrylates or polymethacrylates having mesogens in the side groups. The mesogens in the side group are, for example, cholesterol-substituted phenylbenzoates or biphenols.

The main-chain polymers are preferably liquid-crystalline polyesters, polyamides or polyesteramides comprising aromatic and/or cycloaliphatic hydroxycarboxylic acids, aromatic aminocarboxylic acids; aromatic and/or cycloaliphatic dicarboxylic acids, and aromatic and/or cycloaliphatic diols and/or diamines; and also comprising one or more chiral, bifunctional comonomers.

Cholesteric liquid-crystalline main-chain polymers are prepared in general from a chiral component and from hydroxycarboxylic acids and/or a combination of dicarboxylic acids and diols. In general the polymers consist essentially of aromatic constituents. However, it is also possible to employ aliphatic and cycloaliphatic components, for example cyclohexanedicarboxylic acid.

For the purposes of the present invention preference is given to cholesteric liquid-crystalline main-chain polymers consisting of a) from 0 to 99.8 mol % of one or more compounds from the group consisting of aromatic hydroxycarboxylic acids, cycloaliphatic hydroxycarboxylic acids and aromatic aminocarboxylic acids;

b) from 0 to 50 mol % of one or more compounds from the group consisting of 5 aromatic dicarboxylic acids and cycloaliphatic dicarboxylic acids;

c) from 0 to 50 mol % of one or more compounds from the group consisting of aromatic and cycloaliphatic diols and diamines; and d) from 0.1 to 40 mol %, preferably from 1 to 25 mol %, of chiral, bifunctional comonomers; 0.1 the sum of which is 100 mol %.

In the context of the percentages indicated care should be taken to observe the stoichiometry of the functional groups for the polycondensation, this stoichiometry being known to the skilled worker. In addition, the polymers may also comprise components having only one functional group or having more than two functional groups, for example dihydroxybenzoic acid, trihydroxybenzenes or trimellitic acid. The molecular weights of the polymers can be influenced by this means. The components having more than two functional groups act as a branching site in the polymer and must only be added in small concentrations, for example from 0 to 5 20 mol %, if the intention is to avoid crosslinking of the material during condensation.

Particular preference is given to cholesteric main-group polymers composed of the following structural units of the individual monomer groups:

a) Aromatic hydroxycarboxylic acids, aminocarboxylic acids: hydroxybenzoic acids, hydroxynaphthalenecarboxylic acids, hydroxybiphenylcarboxylic acids, aminobenzoic acids, hydroxycinnamic acids b) Aromatic dicarboxylic acids, aliphatic dicarboxylic acids: terephthalic acid, isophthalic acid, biphenyidicarboxylic acids, naphthalenedicarboxylic acids, cyclohexanedicarboxylic acids, pyridinecarboxylic acids, diphenyl ether dicarboxylic acids, carboxycinnamic acids and also

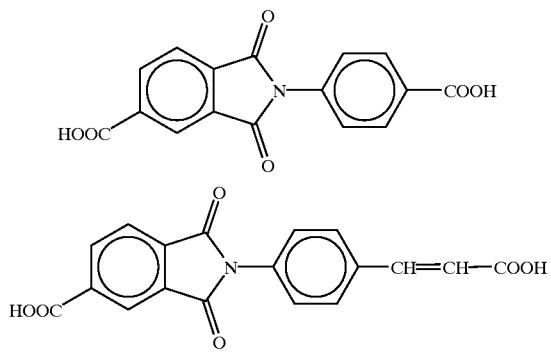

c) Aromatic diols, aminophenols, diamines: hydroquinones, dihydroxybiphenyls, tetramethyldihydroxybiphenyls, naphthalenediols, dihydroxydiphenyl sulfones, dihydroxydiphenyl ethers, dihydroxyterphenyls, dihydroxydiphenyl ketones, phenylenediamines, diaminoanthraquinones, dihydroxyanthraquinones and also

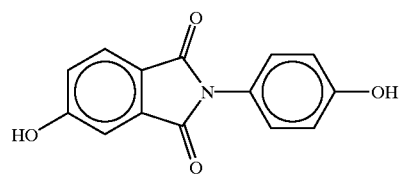

d) Chiral, bifunctional monomers: isosorbide, isomannide, isoidide, camphoric acid, (D)- or (L)-methylpiperazine, (D)- or (L)-3-methyladipic acid, butane-2,3-diol and also

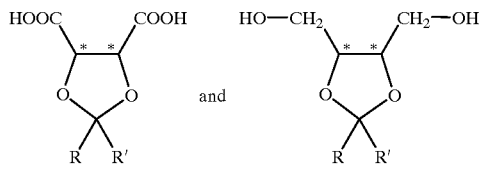

in which R and R' each independently are H, $C_1$–$C_6$-alkyl or phenyl, preferably H or $CH_3$.

The polymer structural units described can also include further substituents, for example methyl, methoxy, cyano or halogen.

For the purposes of the present invention, very particular preference is given to polymers comprising one or more monomers from the group consisting of p-hydroxybenzoic acid, 2-hydroxy-6-naphthoic acid, terephthalic acid, isophthalic acid, 2,6-naphthalenedicarboxylic acid, hydroquinone, resorcinol and 4,4'-dihydroxybiphenyl; and also camphoric acid, isosorbide and/or isomannide as chiral component.

The colorants on which the novel colorant composition is based can be inorganic or organic pigments. Examples of inorganic pigments which may be mentioned are titanium dioxide, iron oxides, metal oxide mixed-phase pigments, cadmium sulfides, ultramarine blue or chromate-molybdate pigments. Organic pigments which can be employed are all pigments known adequately to the skilled worker from the relevant literature, for example W. Herbst, K. Hunger, Industrielle Organische Pigmente, VCH Verlag, 1987, examples being carbon black, anthanthrone, anthraquinone, dioxazine, phthalocyanine, quinacridone, diketopyrrolopyrrole, perylene, perinone, azomethine, isoindoline or azo pigments.

The colorants on which the novel colorant composition is based can also be dyes which are partly or completely dissolved in the cholesteric liquid-crystal polymer. The use of such dyes may be advantageous, since they are normally easier to incorporate into the cholesteric liquid-crystal polymer and give brighter hues. Examples of suitable dyes for the purposes of the present invention are quinophthalone, perinone, anthraquinone, azomethine complex, azlactone and azo dyes.

In order to obtain specific color effects the colorants employed for the novel colorant composition can also be mixtures of different pigments or dyes or mixtures of dyes with pigments.

The proportions of the cholesteric liquid-crystalline polymer to the colorant can vary within wide limits and are dependent on the nature of the colorant and on the particular color effect desired. In general the novel colorant composition consists of from 0.01 to 60% by weight, preferably from 0.1 to 10% by weight, of colorant and from 40 to 99.99% by weight, preferably from 90 to 99.99% by weight, of cholesteric liquid-crystalline polymer. It is also possible for from 0 to 10% by weight, preferably from 0 to 5% by weight, based on the overall weight, of customary auxiliaries and additives to be present in the novel colorant composition, taken from the group consisting of nonionic, anionic or cationic surfactants, synthetic and/or natural waxes, synthetic and/or natural fatty acids or fatty acid esters, stabilizers (for example UV stabilizers or heat stabilizers, and antioxidants), antistatics and optical brighteners. Where the concentrations of colorant are above about 20% by weight the composition is generally a masterbatch, which likewise, as described below, is provided by the invention.

The present invention also provides a process for preparing the novel colorant composition, which comprises mixing a melt of the cholesteric liquid-crystalline polymer with the colorant and, if desired, and additives until there is homogeneous distribution. Mixing can be carried out using all mixing equipment suitable for the purpose, for example dispersion mixers, ®Banbury mixers or screw-type compounders, or by extrusion, for example in a single-screw or twin-screw extruder.

In a further embodiment the colorant can also be added directly during the preparation of the cholesteric liquid-crystalline polymer, judiciously toward the end of the polycondensation reaction and, preferably, directly prior to the discharging of the finished polymer.

It is also possible to incorporate the colorant in the form of a masterbatch into the cholesteric liquid-crystal polymer. Vehicles employed for a masterbatch can be synthetic and natural waxes, polymers and rubbers. The preferred vehicle for a masterbatch, however, is the cholesteric liquid-crystal polymer itself. The masterbatch can comprise a pigment or a dye or else a mixture of different pigments and/or dyes. Furthermore, additional auxiliaries and/or additives can be incorporated into the masterbatch. Such masterbatches can be prepared by all known methods, for example by intimate mixing of the colorants with the vehicle in the melt in appropriate mixing equipment, for example dispersion mixers, Banbury mixers or screw-type compounders, for example twin-screw extruders. The coloring of the cholesteric liquid-crystalline polymer with the masterbatch can be carried out by mixing the two materials and then extruding the mixture. Alternatively, the masterbatch can be metered as a melt into the melt of the cholesteric liquid-crystal polymer by way of a lateral extruder and/or a melt pump. The most economic method is to do this during the discharging of the cholesteric liquid-crystalline polymer from the reactor after the polycondensation.

The colored liquid-crystalline polymers prepared in accordance with the process described above are normally in the form of a physical mixture of colorant and polymer. Since the preparation process generally entails working at relatively high temperatures, it is impossible to rule out the occurrence of at least partial chemical bonding to the cholesteric liquid-crystalline polymer, especially in the case of dyes having functional groups such as carboxyl, sulfo or hydroxyl.

The preparation of the cholesteric liquid-crystalline polymers can be carried out by subjecting the monomeric compounds on which said polymer is based, as such or in the form of a reactive derivative, to condensation in the melt, in solution or in emulsified or disperse phase.

Either the monomers employed in accordance with the invention can be employed directly, or else judicious precursors can be used which react under the subsequent reaction conditions to form the desired monomers. For example, aminophenol and trimellitic anhydride can be employed in place of N-(4-hydroxyphenyl)trimellitimide.

The polycondensation can be carried out by all customary methods. A suitable example is the melt condenstion with acetic anhydride that is described, for example, in U.S. Pat. No. 5,093,025. Condensation with acetic anhydride is also possible in solution or in disperse or emulsified phase.

Linkage of the monomers preferably takes place by way of ester linkages (polyester), amide linkages (polyesteramide/polyamide) and/or by way of imide linkages (polyesterimide/polyimide), although linkage can also take place by way of other known types of linkage.

In place of the carboxylic acids it is also possible to employ carboxylic acid derivatives, for example acid chlorides or carboxylic esters. In place of the hydroxy components it is also possible to employ corresponding hydroxy derivatives, such as the acetylated hydroxy compounds, for example.

The polymers employed in accordance with the invention can also comprise crosslinkable groups, so that it is possible to fix an oriented liquid-crystal polymer by means, for example, of photocrosslinking. Crosslinked cLCPs can be obtained, moreover, by carrying out direct crosslinking of low molecular mass precursors having at least three functional groups or at least two polymerizable double bonds.

In a preferred embodiment the cLCPs are of very low solubility, with the result that their molecular weights cannot be determined by commercially customary methods (GPC, light scattering). As a measure of the molecular weight it is possible to utilize the intrinsic viscosity of the polymers in a solution of pentafluorophenol/hexafluoroisopropanol. Preference is given to polymers having an intrinsic viscosity of between 0.1 dl/g and 10 dl/g.

The polymers employed in accordance with the invention can be employed directly. However, it is also possible to prepare blends of the polymers employed in accordance with the invention. The blends can consist of various polymers, although it is also possible to blend the polymers with other cholesteric or nematic polymers.

The novel colorant compositions can be subjected to further processing in the form of a material of construction. A material of construction is a shaped structure such as, for example, injection moldings, extruded profiles or pipes, strips, sheets or fibers.

The novel colorant compositions can be employed in non-impact printing processes, especially in electrophotographic toners and developers, and in ink-jet inks.

The novel colorant compositions are particularly suitable as a base material for producing effect coatings of all kinds, for example effect powder coatings, and for producing especially platelet-shaped special-effect pigments featuring not only a color effect which is dependent on the colored comonomer and on the viewing angle but also—and especially in the case of pigments as colorants—an increased hiding power.

Effect powder coatings can be applied by the following preferred methods: A fine powder of the novel colorant composition is electrostatically charged in the course of the spraying process. In the case of the corona method this takes place by passing the powder in front of a charged corona, during which the powder itself becomes charged. In the case of the triboelectric or electrokinetic method, the principle of frictional electricity is utilized. In the spraying equipment the powder receives an electrostatic charge which is opposite to the charge of the friction partner, generally a hose or a spraying pipe (for example of polytetrafluoroethylene). The electrostatic charging leads to a high deposition rate of the powder on the article that is to be coated. Following the process of application to the article, the powder layer is heated to temperatures above the softening point of the powder, at which temperatures the polymers form a homogeneous film and the helical superstructures are formed. The temperature at which the formation of the helical structure begins is referred to below as the chiralization temperature.

The specific optical properties of an effect powder coating are only observed when the molecules develop the helical structure at above the chiralization temperature of the polymer. Transition to the cholesteric phase takes place in many cases even during the synthesis of the polymers. The wavelength of the selective reflection of the cLCPs employed in accordance with the invention is determined by the pitch of the helical structure. The pitch depends on the structure of the polymer, on the melt viscosity, on the presence of solvents and, in particular, on the helical twisting power of the chiral monomer. It is additionally a function of temperature. Accordingly, the pitch of the helix can also be established by way of the temperature. By rapid cooling of the coated substrates it is possible to "freeze in" permanently the pitch of the helix and thus the selective reflection. In the case of slow cooling, changes in color must be expected. In general, colored substrates are also obtained by this method. However, it is difficult to define the final color properties beforehand. If the cooled substrate is heated again, then new helical pitches, or even the same helical pitches again, and thus the wavelength of selective reflection, can be established. Through this procedure it is possible to correct and vary the color characteristics of the coated substrate in a simple manner. For use in practice it is important that the melting point and the chiralization temperature of the polymer are above the service temperature of the coated substrate.

The formation of the helical structure can be promoted by the temperature, by the action of shear forces and by substrates having polymeric coats, for example polyvinyl alcohol, cellulose derivatives and polyimides. The orientation process of the polymer molecules can also, depending on the structure of the polymers, be positively influenced by electrical and magnetic fields.

An additional and preferred possibility for coating articles with pulverulent substances is the flame spraying technique. In this technique the powder is fluidized with a carrier gas (for example in a fluidized bed) and is supplied to the central nozzle of a flame spray gun. At the same time, in the flame spray gun a fuel gas/oxygen mixture is produced which is burnt in numerous small flamelets arranged in a ring formation around the center. In this case the pulverulent particles melt and are subsequently deposited, on the article that is to be coated, as droplets which in the course of the spraying process coalesce to form a film. This technique offers the particular advantage that the melting operation is integrated in the spraying process, with the result that application of the coating to the article and the formation of a film can take place in one operation.

Another preferred embodiment for powder coating is the fluidized-bed sintering technique. For this purpose a fluidized bed is produced in an appropriate container with the aid of a carrier gas and the novel colorant composition. In a separate heat chamber, the article to be coated is heated to the temperature required for coating, and on reaching this temperature it is dipped for a defined period into the fluidized bed. During this dipping, pulverulent particles remain adhering to the surface of the article, melt, coalesce to form a film, and form the helical structure. In some cases it is advantageous to subject the coated article to further temperature treatment in order to improve film formation and the orientation of the polymer molecules. In other cases the article is allowed to cool in air or is quenched with water. This technique as well offers the particular advantage that the melting procedure is integrated in the coating process, so that application of the coating to the article, orientation of the polymer molecules and film formation can take place in one operation.

In all of the powder coating techniques described, and especially in the fluidized-bed sintering and flame spraying techniques, the particle morphology and thus the flow behavior of the powder, and also the particle-size distribution of the powder, are of great importance. Preferred particles are those which come as close as possible to the spherical form and have a narrow particle-size distribution. Spherical particles are obtained by simple means in processes in which the polymerization is conducted in an emulsified or dispersed phase. Depending on the type of mill employed, milling processes produce narrower or broader particle-size distributions. In certain cases it is advantageous to follow milling by a sieving, classifying or screening procedure in order to obtain as narrow as possible a particle-size distribution. In other cases it is advantageous first to prepare a very fine powder which can then be subjected to controlled agglomeration to give the desired particle size.

The desired grain fineness is critical for the coat thickness of the effect powder coating, the nature of the article to be coated and the application technique employed. If thin coating films are desired on the article that is to be coated, then the target mean particle size of the powder is between 1 and 100 $\mu$m, preferably between 15 and 80 $\mu$m. If thick films are desired on the article, as are normally applied in the case of fluidized-bed sintering and flame spraying, then a mean particle size of between 80 and 300 $\mu$m, preferably from 100 to 250 $\mu$m, is advantageous. Special attention must be paid to observing the grain size limits in the case of fluidized-bed sintering and flame spraying. Particles that are too small are heated excessively by the high flame temperatures and are carbonized, or are blown away by the gas flow. Particles that are too coarse, on the other hand, are not melted completely and are unable to undergo optimum orientation in the course of the subsequent film formation. In exceptional cases, however, it may also be advantageous to use a particle size distribution lying outside this range.

Effect powder coatings can be applied to a very wide variety of substrates. These substrates may, for example, be articles made of natural and synthetic materials, for example wood, plastics, metal or glass. If the effect coating is applied without a prior coating, then it is advisable to apply it in a coat thickness which masks the substrate. It is of course also possible to apply a plurality of coats or to prepare semi-transparent coatings. Particular preference is given to coating the bodywork, or bodywork parts, of motor vehicles.

In preferred cases the effect powder coating is applied to metal or plastics substrates. In most cases these carry a prior coat. In other words, plastics substrates can be provided with a plastics primer, and metallic substrates generally have an electrophoretically applied primer and, if desired, one or more further coats, for example a filler coat.

Particular preference is given to dark substrates. A dark substrate in this context refers not only to a substrate whose surface has been provided with a dark coat but also to an inherently dark-colored substrate, for example a plastics substrate or a metal substrate that has been coated with a dark oxide layer. Examples of dark coats are electrophoretically applied or spray-applied or powder-applied primers, plastics primers, filler coats and anti-stonechip coats, or else solid-color basecoats and topcoats. Examples of dark substrates are dark red, dark blue, dark green, dark brown, dark gray and, in particular, black. Powder coatings can also be applied to pale substrates or in hiding coats. In that case, however, the viewing-angle-dependent perceived color is evident only to an attenuated extent.

Effect powder coatings can be coated by customary methods with a clearcoat. Suitable clearcoats are, in principle, all known clearcoats or transparent-pigmented coating compositions. In this context it is possible to employ both solvent-containing one-component or two-component coating materials and also, preferably, water-thinnable clearcoats and, in particular, powder coatings. In some cases it may be judicious to choose a somewhat thicker clearcoat or to apply 2 clearcoats comprising identical or different liquid clearcoats or transparent powder coatings. As is known, the clearcoat contains further auxiliaries which enhance the surface properties of the coated articles. Mention may be made, for example, of UV stabilizers and light stabilizers, which protect the underlying coats against degradation reactions.

A further possibility of converting novel colorant compositions into effect coatings is that of melt coating. In this case the colorant composition is applied as a melt to the substrate, or is melted on the substrate, and is processed to give a thin film. One example of a suitable means of applying the polymer melt is a heatable doctor blade. Application can also be made, however, using more simple means, for example a filling knife.

The novel coatings are notable for simple application techniques and advantageous color effects which are dependent on the viewing angle and which cannot be obtained by means of absorption pigments alone and/or by cLCP effect coatings.

In the examples below, parts are by weight.

Examples of Preparing the Cholesteric Liquid-crystal Polymers

Example A 28218 parts of 2-hydroxy-6-naphthoic acid, 34530 parts of 4-hydroxy-benzoic acid, 8307 parts of terephthalic acid, 1862 parts of 4,4'-dihydroxybiphenyl and 5846 parts of 1,4:3,6-dianhydro-D-sorbitol (isosorbide) are placed in a reactor, 52680 parts of acetic anhydride are added, and a gentle stream of nitrogen is flushed through. The mixture is heated to 140° C. over the course of 15 minutes, with stirring, and this temperature is maintained for 30 minutes. The temperature is then raised over the course of 165 minutes to 325° C., and stirring of the melt is continued at this temperature for 30 minutes. From about 220° C., acetic acid begins to distill off. Thereafter, the nitrogen flow is terminated and reduced pressure is slowly applied. The melt is stirred for a further 30 minutes under reduced pressure (about 5 mbar). The polymer is then blanketed with nitrogen, discharged with an extruder and pelletized. The polymer has a bright, greenish yellow color which appears bluish green when viewed at an oblique angle. The color develops even during the condensation under reduced pressure and is retained after cooling.

Example B 28218 parts of 2-hydroxy-6-naphthoic acid, 34530 parts of 4-hydroxy-benzoic acid, 8307 parts of terephthalic acid, 3491 parts of 4,4'-dihydroxybiphenyl and 4795 parts of 1,4:3,6-dianhydro-D-sorbitol (isosorbide) are placed in a reactor, 52680 parts of acetic anhydride are added, and a gentle stream of nitrogen is flushed through. The mixture is heated to 140° C. over the course of 15 minutes, with stirring, and this temperature is maintained for 30 minutes. The temperature is then raised over the course of 165 minutes to 325° C., and stirring of the melt is continued at this temperature for 30 minutes. From about 220° C., acetic acid begins to distill off. Thereafter, the nitrogen flow is terminated and reduced pressure is slowly applied. The melt is stirred for a further 30 minutes under reduced pressure (about 5 mbar). The polymer is then blanketed with nitrogen, discharged with an extruder and pelletized. The polymer has a bright, golden yellow color which appears green when viewed at an oblique angle. The color develops even during the condensation under reduced pressure and is retained after cooling.

Example C 28218 parts of 2-hydroxy6-naphthoic acid, 34530 parts of 4-hydroxy-benzoic acid, 8307 parts of terephthalic acid, 2793 parts of 4,4'-dihydroxybiphenyl and 5115 parts of 1,4:3,6-dianhydro-D-sorbitol (isosorbide) are placed in a reactor, 52680 parts of acetic anhydride are added, and a gentle stream of nitrogen is flushed through. The mixture is heated to 140° C. over the course of 15 minutes, with stirring, and this temperature is maintained for 30 minutes. The temperature is then raised over the course of 165 minutes to 325° C., and stirring of the melt is continued at this temperature for 30 minutes. From about 2200° C., acetic acid begins to distill off. Thereafter, the nitrogen flow is terminated and reduced pressure is slowly applied. The melt is stirred for a further 30 minutes under reduced pressure (about 5 mbar). The polymer is then blanketed with nitrogen, discharged with an extruder and pelletized. The polymer has a bright, coppery orange color which appears reddish yellow when viewed at an oblique angle. The color develops even during the condensation under reduced pressure and is retained after cooling.

Examples of Preparing the Cholesteric Liquid-crystal Polymers Colored in Accordance with the Invention

Example 1

288 parts of cholesteric liquid-crystal polymer prepared in accordance with Example A are mixed with 18 parts of C.I. Pigment Yellow 180 and the mixture is then extruded in a ®Rheomex single-screw extruder (from Haake; screw diameter 19 mm; length L/D =25:1; screw with mixing zone). The intake zone is heated at 240° C. and the subsequent zones at 275° C. The plastic mass is extruded in a strand and is chopped into granules. The colorant composition obtained has a bright yellow color which when viewed at an oblique angle appears yellowish green.

Example 2

Example 1 is repeated except that 18 parts of C.I. Pigment Green 7 are used instead of C.I. Pigment Yellow 180.

The colorant composition obtained has a bright, greenish yellow color which when viewed at an oblique angle appears green.

Example 3

288 parts of cholesteric liquid-crystal polymer prepared in accordance with Example B are mixed with 18 parts of C.I. Pigment Blue 15:1 and the mixture is then extruded in a ®Rheomex single-screw extruder (from Haake; screw diameter 19 mm; length L/D =25:1; screw with mixing zone). The intake zone is heated at 240° C. and the subsequent zones at 275° C. The plastic mass is extruded in a strand and is chopped into granules. The colorant composition obtained has a bright reddish yellow color which when viewed at an oblique angle appears green to greenish blue.

Example 4:

292.5 parts of cholesteric liquid-crystal polymer prepared in accordance with Example C are mixed with 7.5 parts of C.I. Pigment Red 149 and the mixture is then extruded in a ®Rheomex single-screw extruder (from Haake; screw diameter 19 mm; length L/D =25:1; screw with mixing zone). The intake zone is heated at 240° C. and the subsequent zones at 275° C. The plastic mass is extruded in a strand and is chopped into granules. The colorant composition obtained has a bright coppery red color which when viewed at an oblique angle appears orange.

Example 5

295.5 parts of cholesteric liquid-crystal polymer prepared in accordance with Example A are mixed with 4.5 parts of C.I. Solvent Blue 122 and the mixture is then extruded in a ®Rheomex single-screw extruder (from Haake; screw diameter 19 mm; length L/D =25:1; screw with mixing zone). The intake zone is heated at 240° C. and the subsequent zones at 275° C. The plastic mass is extruded in a strand and is chopped into granules. The colorant composition obtained has a bright greenish yellow color which when viewed at an oblique angle appears green to blue depending on the viewing angle.

Example 6

295.5 parts of cholesteric liquid-crystal polymer prepared in accordance with Example C are mixed with 4.5 parts of C.I. Disperse Yellow 94 and the mixture is then extruded in a ®Rheomex single-screw extruder (from Haake; screw diameter 19 mm; length L/D =25:1; screw with mixing zone). The intake zone is heated at 240° C. and the subsequent zones at 275° C. The plastic mass is extruded in a strand and is chopped into granules. The colorant composition obtained has a bright yellowish orange color which when viewed at an oblique angle appears yellow.

Example 7

Example 6 is repeated but using 4.5 parts of a polymer-soluble red dye having the following constitution

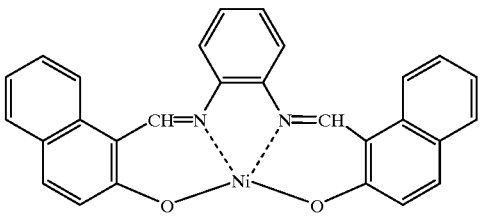

instead of C.I. Disperse Yellow 94. The colorant composition obtained has a bright, coppery red color which when viewed at an oblique angle appears yellowish brown.

What is claimed is:

1. A colorant composition consisting essentially of one or more cholesteric liquid-crystalline polymers which reflects light in the visible wavelength range and at least one colorant which absorbs light in the visible wavelength range, wherein said colorant is an inorganic pigment, an organic pigment, a dye selected from the group consisting of a quinophthalone, perinone, anthraquinone, azomethine complex, azlactone and azo dye, or a combination thereof and wherein said polymer is a liquid-crystalline main-chain polymer selected from the group of liquid-crystalline polyesters or polyesteramides comprising:

aromatic hydroxycarboxylic acids, cycloaliphatic hydroxycarboxylic acids, aromatic aminocarboxylic acids, aromatic dicarboxylic acids, cycloaliphatic dicarboxylic acids, aromatic diols, cycloaliphatic diols, aromatic and cycloaliphatic diols, diamines, and also comprising one or more chiral, bifunctional comonomers wherein said chiral, bifunctional comonomer is selected from the group consisting of isosorbide, isomannide, isodide, camphoric acid, butane-2,3-diol,

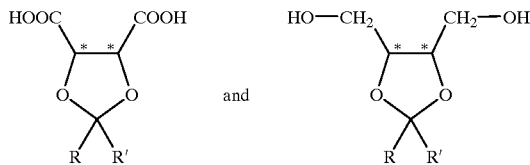

in which R and R' are each independently H, $C_1$–$C_6$-alkyl or phenyl.

2. The colorant composition as claimed in claim 1, wherein the main-chain polymer consists of from 0 to 99.8 mol % of one or more compounds from the group consisting of aromatic hydroxycarboxylic acids, cycloaliphatic hydroxycarboxylic acids and aromatic aminocarboxylic acids; from 0 to 50 mol % of one or more compounds from the group consisting of aromatic dicarboxylic acids and cycloaliphatic dicarboxylic acids; from 0 to 50 mol % of one or more compounds from the group consisting of aromatic and cycloaliphatic diols and diamines; and from 0.1 to 40 mol % of chiral, bifunctional comonomers; the sum of which is 100 mol %.

3. The colorant composition as claimed in claim 2, wherein the main-chain polymer consists of from 1 to 25 mol-% of chiral, bifunctional comonomers.

4. The colorant composition as claimed in claim 1, wherein the main-chain polymer comprises one or more compounds from the group consisting of p-hydroxybenzoic acid, 2-hydroxy-6-naphthoic acid, terephthalic acid, isophthalic acid, 2,6-naphthalenedicarboxylic acid, hydroquinone, resorcinol and 4,4'-dihydroxybiphenyl.

5. The colorant composition as claimed in claim 1, wherein the organic pigment is carbon black or an anthanthrone, anthraquinone, dioxazine, phthalocyanine, quinacridone, diketopyrrolopyrrole, perylene, perinone, azomethine, isoindoline or azo pigment.

6. The colorant composition as claimed in claim 1, consisting of from 0.01 to 60% by weight of colorant, from 40 to 99.99% by weight of cholesteric liquid-crystalline polymer and from 0 to 10% by weight of customary auxiliaries and additives.

7. A process for preparing a colorant composition as claimed in claim 1, which comprises mixing a melt of the cholesteric liquid-crystalline polymer with the colorant and, optionally, with the auxiliaries and additives until there is homogeneous distribution, or comprises adding the colorant and, optionally, the auxiliaries and additives during the polycondensation of the polymer.

8. The process as claimed in claim 7, wherein mixing is carried out by extrusion.

9. A method of providing a material of construction comprising the step of shaping a colorant composition as claimed in claim 1.

10. A method of producing special-effect pigments or effect coatings comprising the step of processing a colorant composition as claimed in claim 1 into a special-effect pigment or effect coating.

* * * * *